United States Patent [19]

Polando

[11] Patent Number: 5,724,858
[45] Date of Patent: Mar. 10, 1998

[54] INFINITE ADJUSTMENT FOR MOTION TRANSMITTING REMOTE CONTROL ASSEMBLY

[75] Inventor: Scott Polando, Oxford, Mich.

[73] Assignee: Teleflex Incorporated, Plymouth Meeting, Pa.

[21] Appl. No.: 657,634

[22] Filed: May 30, 1996

[51] Int. Cl.⁶ .................................. G05G 5/06; F16C 1/22
[52] U.S. Cl. .................... 74/502.6; 74/502.4; 74/527; 74/501.5 R; 188/67; 403/106
[58] Field of Search .............................. 74/527, 501.5 R, 74/502.4, 502.6, 502; 188/67, 77 W; 403/106

[56] References Cited

U.S. PATENT DOCUMENTS

| | | |
|---|---|---|
| 3,874,480 | 4/1975 | Porter et al. |
| 4,411,339 | 10/1983 | Porter . |
| 4,457,406 | 7/1984 | Porter . |
| 4,577,730 | 3/1986 | Porter . |
| 4,887,929 | 12/1989 | Hale .................. 74/502.6 X |
| 5,150,771 | 9/1992 | Porter . |
| 5,156,064 | 10/1992 | Truman ................ 403/106 |
| 5,157,826 | 10/1992 | Porter et al. . |
| 5,219,045 | 6/1993 | Porter et al. . |
| 5,280,733 | 1/1994 | Reasoner ............. 74/502.4 |
| 5,435,203 | 7/1995 | Spease et al. ......... 74/502.6 |

FOREIGN PATENT DOCUMENTS

| | | | |
|---|---|---|---|
| 0397611 | 11/1990 | European Pat. Off. ........ 74/502.6 |
| 0511088 | 10/1992 | European Pat. Off. ........ 74/502.4 |
| 2-159408 | 6/1990 | Japan ..................... 74/502.6 |
| 4-29609 | 1/1992 | Japan ..................... 74/502.6 |
| 2241767 | 9/1991 | United Kingdom ........... 74/502.6 |

*Primary Examiner*—Vinh T. Luong
*Attorney, Agent, or Firm*—Howard & Howard

[57] ABSTRACT

An adjustment mechanism for adjusting the axial position of a terminal (16) along the end of the core element rod (12) in a motion transmitting remote control assembly (10). A coil spring (24) normally grips the knurled end of the rod (12) to prevent axial movement of the terminal member (16) relative to the rod (12). A collar (34) is rotatably disposed about the terminal member (16) and includes a slot (36) engaging a movable end (28) of the spring (24) for moving the end (28) of the spring (24) circumferentially along a recess (32) in the terminal member (16). As the collar (34) is rotated, a first end (26) of the spring (24) is held circumferentially by a hole (30) and the spring (24) unwinds as the slot (36) engages and moves the movable end (28) of the spring (24) circumferentially. The collar (34) may be rotated about the female terminal member (16) to move the end (28) of the spring (24) circumferentially along the recess (32) in the female terminal member (16) to unwind the spring (24) as the circumferential groove (40) moves over the first end (26) of the spring (24) and whereupon the collar (34) may be moved axially to move the axial groove (38) over the first end (26) of the spring (24) to hold the spring (24) circumferentially in the uncoiled release position.

14 Claims, 3 Drawing Sheets

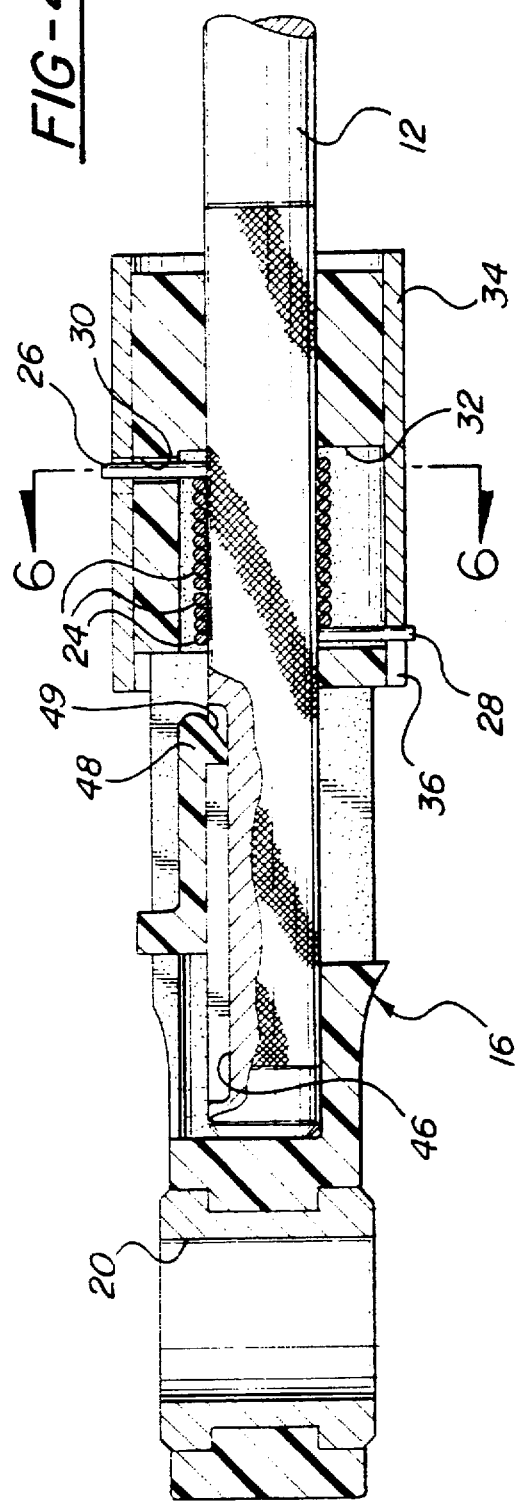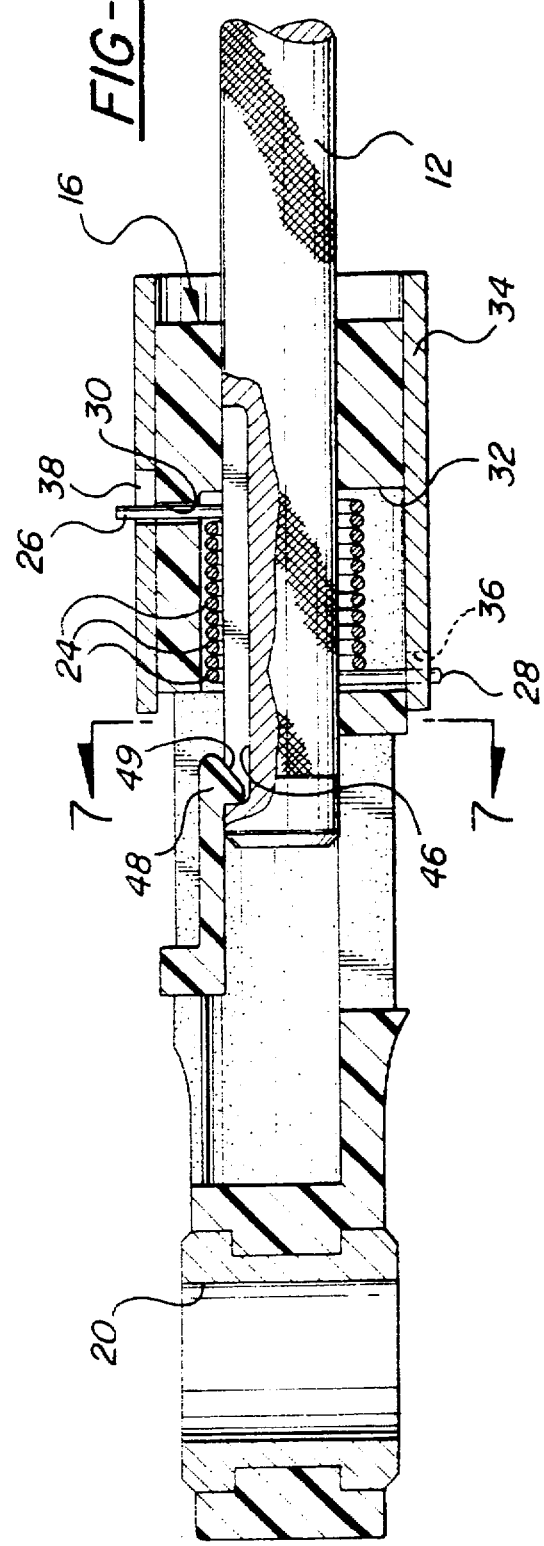

INFINITE ADJUSTMENT FOR MOTION TRANSMITTING REMOTE CONTROL ASSEMBLY

BACKGROUND OF THE INVENTION

1. Field of Invention

This invention relates to a motion transmitting remote control assembly of the type for transmitting motion in a curved path by a flexible motion transmitting core element movably supported by a conduit, and more particularly, to such and assembly including a mechanism for adjusting the length of the core element of the conduit.

2. Description of the Prior Art

Such remote control assemblies are typically routed in circuitous paths through an automobile with the conduit attached to the vehicle body and the ends of the core element connected to input and output control members. The installation tolerances are such that either the length of the conduit must be adjusted to vary the distance the core element extends from the ends of the conduit or the length of the core element itself must be adjusted to properly align the terminals at the ends of the core element for connection to the control members.

There are numerous mechanisms known for accomplishing this adjustment in remote control assemblies. Quite a number utilize a coil spring supported by a female member for gripping a male member extending through the spring. The coil spring is unwound for releasing its grip upon the male member to allow the male member to move axially relative to the female member.

Although not related to flexible motion transmitting remote control assemblies of the type to which the instant invention relates, numerous friction brake devices utilizing a coil spring are disclosed in U.S. Pat. Nos. to Clyde R. Porter 3,874,480; 4,411,339; 4,457,406; 4,577,730; 5,150,771; 5,157,826 and 5,219,045. However, none of these patents suggest an adjustment mechanism for a motion transmitting remote control assembly wherein the coil spring is held in the release position to allow shipment, installation and adjustment before being released to the gripping position to fix the length of the components.

SUMMARY OF THE INVENTION

A motion transmitting remote control assembly for transmitting motion in a curved path by a flexible motion transmitting core element movably supported by a conduit and an adjustment mechanism for adjusting the length of one of the conduit and the core element. The adjustment mechanism includes a female member and a male member slidably supported in the female member and a coil spring coiled about the male member for gripping engagement with the male member to prevent relative movement between the male member and female member. The spring has a first end secured to the female member to prevent circumferential movement of the first end of the spring relative to the female member and a second end circumferentially movable relative to the female member between a gripping position preventing axial movement of the male member relative to the spring and an uncoiled release position allowing axial movement of the male member relative to the spring. The adjustment mechanism characterized by a detent for selectively retaining the second end of the spring in the release position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is an enlarged cross-sectional view taken substantially along line 4—4 of FIG. 1 showing the assembly in the gripping position to prevent relative axial movement;

FIG. 5 is an enlarged view like FIG. 4 but showing the assembly in the release position to allow relative axial movement;

DETAILED DESCRIPTION OF THE PREFERRED EMBODIMENT

Figure 1:
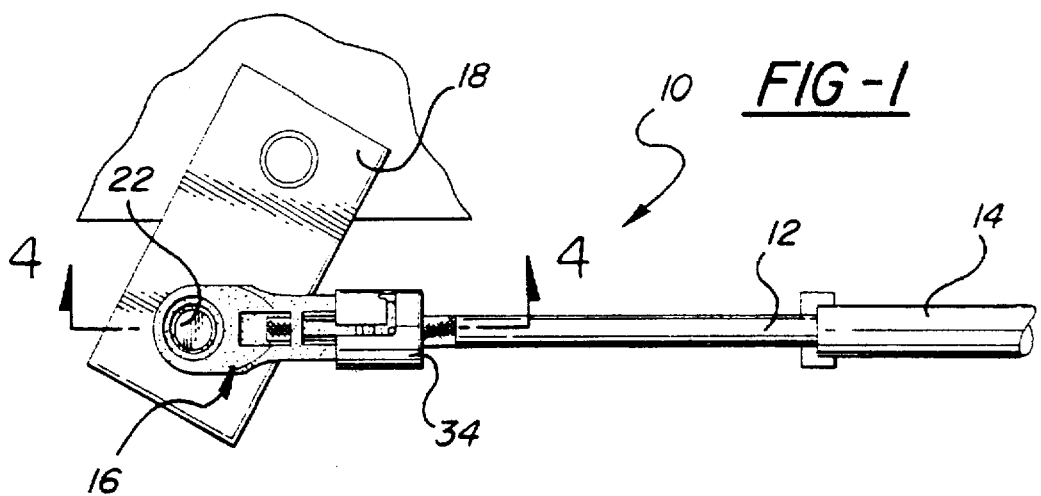
FIG. 1 is a fragmentary elevational view of a preferred embodiment.
Figure 2:
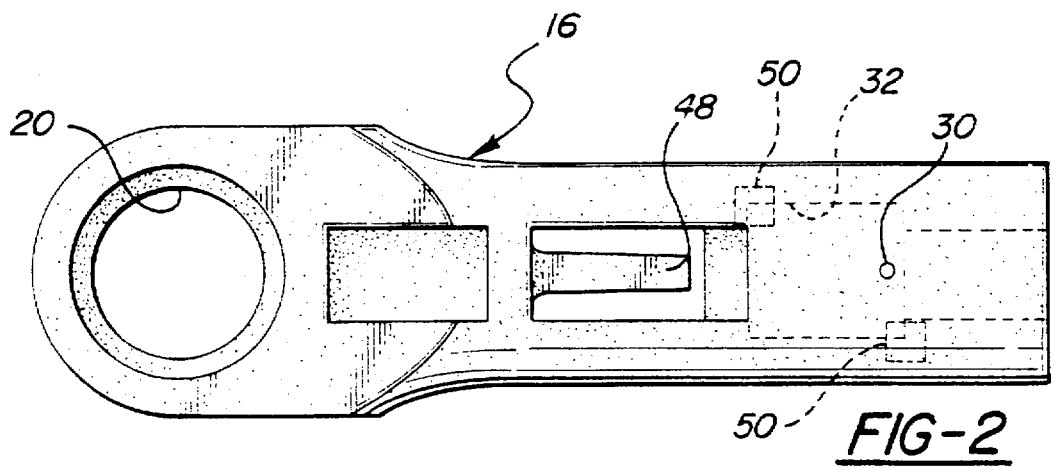
FIG. 2 is an enlarged frontal view of the terminal member of FIG. 1.
Figure 3:
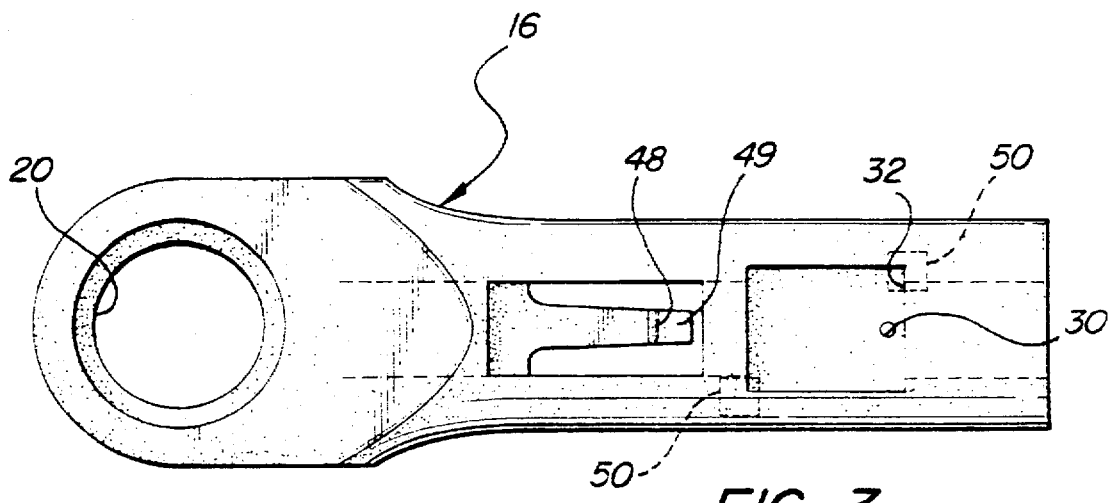
FIG. 3 is an enlarged rear view of the terminal of FIG. 2.
Figure 6:
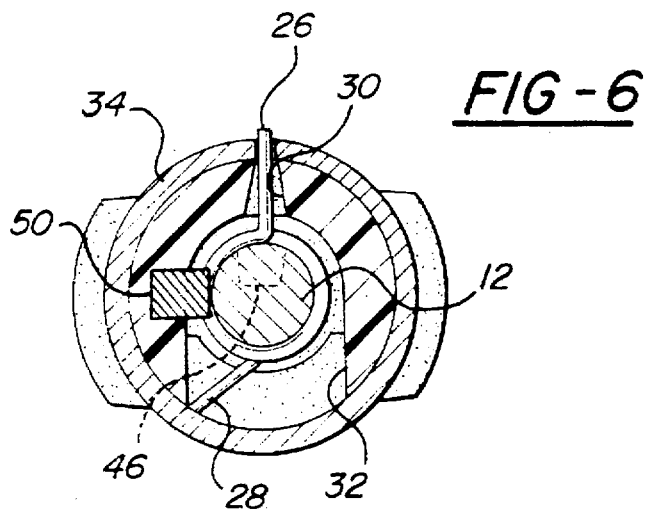
FIG. 6 is a cross-sectional view taken substantially along line 6—6 of FIG. 4.
Figure 7:
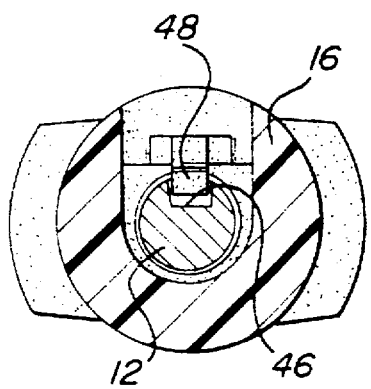
FIG. 7 is a cross-sectional view taken substantially along line 7—7 of FIG. 5.

Referring to the Figures, wherein like numerals reference like or corresponding parts throughout the several views, a motion transmitting remote control assembly for transmitting motion in a curved path is generally shown at 10 in FIG. 1. The assembly 10 includes a flexible motion transmitting core element 12 moveably supported by a conduit 14. The conduit 14 is of the well known construction comprising an inner tubular member of extruded plastic surrounded by a complement of wires or filaments disposed about the inner tubular member on a long helical lead, with a plastic casing extruded about the long lay wires. The core element comprises a wire or stranded cable, which is not shown, attached to a rod, which is shown, and which extends from the end of the conduit 14. A terminal member is generally indicated at 16 for connecting the rod 12 of the core element to a control member 18. This connection is accomplished by a bushing 20 supported in a terminal hole in the terminal 16 to surround a post 22 extending from the control member 18. The end of the conduit 14 typically includes a fitting disposed thereon for providing a rigid support for the in and out movement of the rod 12.

An adjustment mechanism is incorporated for adjusting the length of one of the conduit and the core element, the core element in this preferred embodiment. More specifically, the adjustment mechanism includes a female member defined by the terminal member 16 and a male member defined by the rod 12 slidably supported in the female terminal member; or said another way, the terminal member 16 is slidably supported on the rod 12, i.e., in telescoping relationship with one another. A coil spring 24 is coiled about the male rod 12 for gripping engagement with the rod 12 to prevent relative movement between the rod 12 and terminal member 16. The rod 12 is knurled adjacent the end to increase this gripping engagement.

The spring 24 has a first end 26 secured to the terminal member 16 to prevent circumferential movement of the first end 26 of the spring 24 relative to the terminal member 16. The spring 24 has a second end 28 circumferentially moveable relative to the terminal member 16 between a gripping position preventing axial movement of the male rod 12 relative to the spring 24 and an uncoiled release position allowing axial movement of the male rod relative 12 relative to the spring 24.

Figure 8:
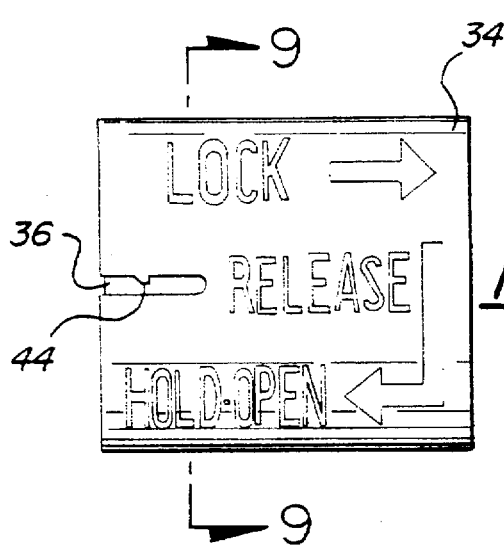
FIG. 8 is a side view of the detent-collar for moving the spring between the gripping and release positions.
Figure 9:
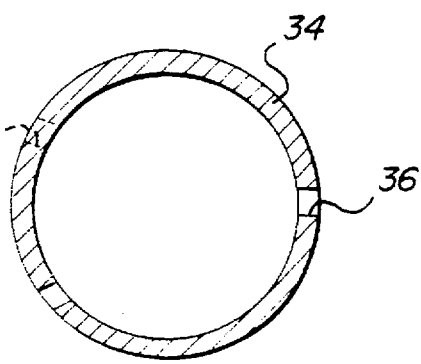
FIG. 9 is a cross-sectional view taken substantially along line 9—9 of FIG. 8.
Figure 10:
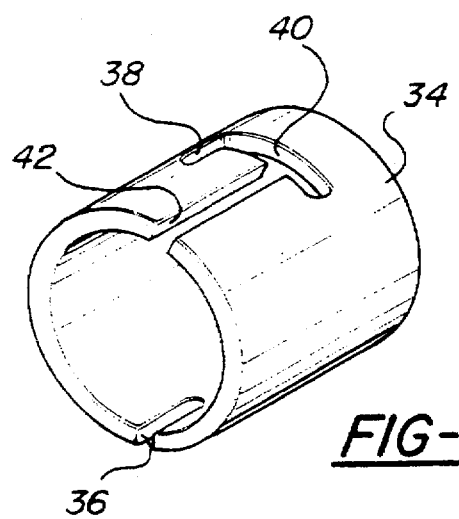
FIG. 10 is a perspective view of the detent-collar of FIGS. 8 and 9.

The adjustment mechanism is characterized by a detent for selectively retaining the second end 28 of the spring 24 in the release position shown in FIG. 5, wherein the spring is unwound from gripping engagement with the rod 12. More particularly, a radially extending hole 30 is disposed in the female terminal member 16 and the first end 26 of the spring 24 extends radially into the hole 30. The female terminal member 16 also includes a circumferentially extending recess 32 and the second end 28 of the spring 24 extends radially into the recess 32 for circumferential movement therealong, i.e., from one side to the other of the recess 32. The detent reacts between the second or moveable end 28 of the spring 24 and the female terminal member 16 for selectively retaining the second or moveable end 28 of the spring 24 in the uncoiled release position, as shown in FIG. 5. The detent includes a tubular collar 34 rotatably disposed about the female terminal member 16. The collar 34 includes an abutment defined by a slot 36 engaging the second or movable end 28 of the spring 24 for moving the second end 28 of the spring 24 circumferentially along the recess 32. As the collar 34 is rotated, the first end 26 of the spring 24 is fixed as it is held circumferentially by the hole 30 and the spring 24 unwinds as the slot 36 engages and moves the second end 28 of the spring 24 circumferentially. The collar 34 includes a catch defined by an axial groove 38 for retaining the collar 34 in the release position against the biasing action of the spring 24 to allow the relative axial movement between the male rod 12 and the female terminal member 16 during shipment and installation. To this end, the hole 30 extends completely through the female terminal member 16 and the first end 26 of the spring 24 extends through the hole 30 and exteriorly of the female terminal member 16. The collar 34 includes a circumferentially extending groove 40 and the first end 26 of the spring 24 extends into the groove 40. The catch 38 is disposed adjacent the groove 40 for catching on the first end 26 of the spring 24. The axial groove 38 extends axially from the circumferential groove 40 whereby the collar 34 may be rotated about the female terminal member 16 to move the second end 28 of the spring 24 circumferentially along the recess 32 in the female terminal member 16 to unwind the spring 24 as the circumferential groove 40 moves over the first end 26 of the spring 24 and whereupon the collar 34 may be moved axially to move the axial groove 38 over the first end 26 of the spring 24 to hold the spring 24 circumferentially in the uncoiled release position. As shown in FIG. 8, indicia are disposed on the collar 34 for indicating the rotary and axial movement of the collar to and from the release position.

The collar 34 also includes a groove 42 extending axially into the collar 34 to join the circumferentially groove 40. During assembly the collar 34 is moved axially onto the female terminal member 16 and the first end 26 moves along the groove 42 as the second end 26 of the spring 24 moves along the slot 36, which includes a retraining ramp 44 over which the second end 28 of the spring 24 snaps and is retained. The grooves are slots as shown because they extend completely through the collar. However, the grooves may, indeed, be grooves by extending only partially into the interior of the collar 34, i.e., just deep enough to capture and retain the ends 26 and 28 of the spring 24.

Instead of the collar 34, the detent may comprise a hook extending from the female member 16 whereby the moveable end 28 of the spring 24 is moved manually over and released into engagement with the hook and manually moved out of engagement with the hook and released for the spring 24 to grip the rod 12.

The female member 16 and the male member 12 include a slide connection therebetween for preventing relative rotation between the male 12 and the female member 16 while allowing relative axial movement therebetween. The slide connection comprises a trough 46 extending axially along the male rod member 12 and a tab 48 extending into the trough 46 from the female member 16. The tab 48 is in the shape of an elongated flexible finger with a ramp 49 on the end thereof for flexing the finger during initial insertion of the male rod member 12 into the female terminal member 16 and for retaining the male rod 12 slidably disposed in the female terminal 16.

In addition, a pair of pins defining stops 50 for engaging the respective ends or end coils of the spring 24 upon relative longitudinal movement between the rod 12 and the female member 16. In other words, as the spring 24 is gripping the rod 12 and the rod 12 is urged axially, one of the stops 50 engages the slanted end of the spring 24 to further skew or slant the coils of the spring to drive the coils into tighter gripping engagement with the rod 12. Said another way, the stops 50 adjacent each end of the spring 24 drive the spring 24 into tighter gripping engagement with the rod 12 in response to relative movement or forced between the rod 12 and the female terminal 16.

The invention has been described in an illustrative manner, and it is to be understood that the terminology which has been used is intended to be in the nature of words of description rather that of limitation.

Obviously, many modifications and variations of the present invention are possible in light of the above teachings. It is, therefore, to be understood that within the scope of the appended claims, wherein reference numerals are merely for convenience and are not to be in a any way limiting, the invention may be practiced otherwise than as specifically described.

What is claimed:

1. A motion transmitting remote control assembly (10) comprising:

a conduit (14);

a flexible motion transmitting core element movably supported by said conduit (14);

an adjustment mechanism for adjusting the length of one of said conduit (14) and said core element (12);

said adjustment mechanism including a female member (16) and male member (12) slidably supported in said female member (16), a coil spring (24) coiled about said male member (12) for gripping engagement with said male member (12) to prevent relative movement between said male member (12) and said female member (16);

said spring (24) having a first end (26) secured to said female member (16) to prevent circumferential movement of said first end (26) of said spring (24) relative to said female member (16), said spring (24) having a second end (28) circumferentially moveable relative to said female member (16) between a gripping position preventing axial movement of said male member (12) relative to said spring (24) and an uncoiled release position allowing axial movement of said male member (12) relative to said spring (24); and a detent for selectively retaining said second end (28) of said spring (24) in said release position.

2. An assembly as set forth in claim 1 including a hole (30) in said female member (16), said first end (26) of said spring (24) extending radially into said hole (30).

3. An assembly as set forth in claim 2 wherein said female member (16) includes a circumferentially extending recess (32) and said second end (28) of said spring (24) extends radially into said recess (32) for circumferential movement therealong.

4. An assembly as set forth in claim 3 wherein said detent reacts between said second end (28) of said spring (24) and said female member (16) for retaining said second end (28) of said spring (24) in said uncoiled release position.

5. An assembly as set forth in claim 4 wherein said detent comprises a collar (34) rotatably disposed about said female member (16).

6. An assembly as set forth in claim 5 wherein said collar (34) includes an abutment (36) engaging said second end (28) of said spring (24) for moving said second end (28) of said spring (24) circumferentially along said recess (32).

7. An assembly as set forth in claim 6 wherein said collar (34) includes a catch (38) for retaining said collar (34) in said release position against the biasing action of said spring (24) to allow said relative axial movement between said male member (12) and said female member (16).

8. An assembly as set forth in claim 7 wherein said collar (34) includes a circumferentially extending groove (40), said hole (30) extends through said female member (16) and said first end (26) of said spring (24) extends through said hole (30) and exteriorly of said female member (16) and into said groove (40), said catch (38) being disposed adjacent said groove (40) for catching on said first end (26) of said spring (24).

9. An assembly as set forth in claim 8 wherein said catch (38) extends axially from said circumferential groove (40) whereby said collar (34) is rotatable about said female member (16) to move said second end (28) of said spring (24) circumferentially along said recess (32) in said female member (16) to unwind said spring (24) as said circumferential groove (40) moves over said first end (26) of said spring (24) and whereupon said collar (34) is moved axially to move said catch (38) over said first end (26) of said spring (24) to hold spring (24) circumferentially in said uncoiled release position.

10. An assembly as set forth in claim 9 including indicia on said collar (34) for indicating the rotary and axial movement of said collar (34) to and from said release position.

11. An assembly as set forth in claim 4 including a slide connection (46, 48) between said female member (16) and said male member (12) for preventing relative rotation between said male (12) and female (16) members while allowing relative axial movement therebetween.

12. An assembly as set forth in claim 11 wherein said slide connection includes a trough (46) extending axially along said male member (12) and a tab (48) extending into said trough (46) from said female member (16).

13. An assembly as set forth in claim 12 wherein said tab (48) has the shape of an elongated finger with a ramp (49) disposed on the end thereof for flexing said tab during initial insertion of said male member (12) into said female member (16) and for retaining said male member (12) slidably disposed in said female member (16).

14. An assembly as set forth in claim 1 including a stop (50) adjacent each end of said spring (24) for driving said spring (24) into tighter gripping engagement with said male member (12) in response to relative movement between said male member (12) and said female member (16).

* * * * *